United States Patent
Weaver et al.

(10) Patent No.: US 10,665,205 B2
(45) Date of Patent: May 26, 2020

(54) DETERMINING CORRELATED MOVEMENTS ASSOCIATED WITH MOVEMENTS CAUSED BY DRIVING A VEHICLE

(71) Applicant: Google Inc., Mountain View, CA (US)

(72) Inventors: Joshua Weaver, San Jose, CA (US); Thad Eugene Starner, Mountain View, CA (US)

(73) Assignee: Google LLC, Mountain View, CA (US)

( * ) Notice: Subject to any disclaimer, the term of this patent is extended or adjusted under 35 U.S.C. 154(b) by 697 days.

(21) Appl. No.: 14/612,743

(22) Filed: Feb. 3, 2015

(65) Prior Publication Data
US 2015/0154940 A1 Jun. 4, 2015

Related U.S. Application Data

(63) Continuation of application No. 13/604,361, filed on Sep. 5, 2012, now Pat. No. 8,952,869.
(Continued)

(51) Int. Cl.
*G09G 5/12* (2006.01)
*G02B 27/01* (2006.01)
(Continued)

(52) U.S. Cl.
CPC .............. *G09G 5/12* (2013.01); *G02B 27/017* (2013.01); *G06F 3/011* (2013.01); *G06F 3/147* (2013.01);
(Continued)

(58) Field of Classification Search
CPC ...... G09G 5/12; G09G 5/006; G09G 2354/00; G09G 2320/08; G09G 2320/10;
(Continued)

(56) References Cited

U.S. PATENT DOCUMENTS

| 5,138,555 A | 8/1992 | Albrecht |
| 5,231,379 A * | 7/1993 | Wood ..................... G02B 27/01 340/980 |

(Continued)

FOREIGN PATENT DOCUMENTS

| JP | 62157007 | 7/1987 |
| JP | 2005-70308 | 3/2005 |

(Continued)

OTHER PUBLICATIONS

Salvucci et al., "The time course of a lane change: Driver control and eye-movement behavior", Transportation Research Part F 5, pp. 123-132 (Mar. 2002).
(Continued)

*Primary Examiner* — Vinh T Lam
(74) *Attorney, Agent, or Firm* — McDonnell Boehnen Hulbert & Berghoff LLP

(57) ABSTRACT

Example methods and systems for determining correlated movements associated with movements caused by driving a vehicle are provided. In an example, a computer-implemented method includes identifying a threshold number of sets of correlated movements. The method further includes determining that the threshold number of sets of correlated movements is associated with movements caused by driving a vehicle. The method still further includes causing the wearable computing system to select a driving user interface for the wearable computing system.

22 Claims, 8 Drawing Sheets

Related U.S. Application Data

(60) Provisional application No. 61/583,640, filed on Jan. 6, 2012.

(51) Int. Cl.
*G06F 3/01* (2006.01)
*G09G 5/00* (2006.01)
*G06F 3/147* (2006.01)

(52) U.S. Cl.
CPC ............ *G09G 5/00* (2013.01); *G09G 5/006* (2013.01); *G02B 2027/0178* (2013.01); *G09G 2320/08* (2013.01); *G09G 2320/10* (2013.01); *G09G 2340/12* (2013.01); *G09G 2340/125* (2013.01); *G09G 2354/00* (2013.01); *G09G 2380/10* (2013.01)

(58) Field of Classification Search
CPC .......... G09G 2380/10; G09G 2340/12; G09G 2340/125; G02B 2027/0178; G02B 27/017; B60K 35/00; B60K 2350/2052; G06F 3/147; G06F 3/011
USPC ............... 345/156, 8, 4; 340/573.1, 576
See application file for complete search history.

(56) References Cited

U.S. PATENT DOCUMENTS

| | | | |
|---|---|---|---|
| 5,506,730 A | 4/1996 | Morley | |
| 5,519,410 A * | 5/1996 | Smalanskas | B60K 35/00 345/7 |
| 5,579,026 A * | 11/1996 | Tabata | H04N 13/117 345/8 |
| 5,635,948 A | 6/1997 | Tonosaki | |
| 6,861,970 B1 * | 3/2005 | Garland | G01S 7/4806 342/175 |
| 6,919,866 B2 | 7/2005 | Kanevsky | G01C 21/365 345/633 |
| 7,010,332 B1 | 3/2006 | Irvin et al. | |
| 7,123,215 B2 | 10/2006 | Nakada | |
| 7,167,779 B2 * | 1/2007 | Kashiwada | G02B 27/01 340/435 |
| 7,180,476 B1 * | 2/2007 | Guell | G01S 19/15 340/980 |
| 7,255,437 B2 | 8/2007 | Howell et al. | |
| 7,315,254 B2 | 1/2008 | Smith et al. | |
| 7,327,239 B2 * | 2/2008 | Gallant | B60K 35/00 340/438 |
| 7,401,918 B2 | 7/2008 | Howell et al. | |
| 7,474,889 B2 | 1/2009 | Bhakta et al. | |
| 7,481,531 B2 | 1/2009 | Howell et al. | |
| 7,500,746 B1 | 3/2009 | Howell et al. | |
| 7,542,012 B2 | 6/2009 | Kato et al. | |
| 7,581,833 B2 | 9/2009 | Howell et al. | |
| 7,593,757 B2 | 9/2009 | Yamasaki | |
| 7,614,001 B2 * | 11/2009 | Abbott | G06F 1/163 706/45 |
| 7,677,723 B2 | 3/2010 | Howell et al. | |
| 7,771,046 B2 | 8/2010 | Howell et al. | |
| 7,783,391 B2 * | 8/2010 | Jeong | A61B 5/04888 600/587 |
| 7,806,525 B2 | 10/2010 | Howell et al. | |
| 7,877,686 B2 | 1/2011 | Abbott et al. | |
| 7,922,321 B2 | 4/2011 | Howell et al. | |
| 7,945,297 B2 | 5/2011 | Philipp | |
| 7,987,070 B2 | 7/2011 | Kahn et al. | |
| 8,045,727 B2 | 10/2011 | Philipp | |
| 8,109,629 B2 | 2/2012 | Howell et al. | |
| 8,184,067 B1 | 5/2012 | Braun et al. | |
| 8,212,662 B2 | 7/2012 | Sasaki et al. | |
| 8,335,312 B2 | 12/2012 | Gerhardt et al. | |
| 8,384,617 B2 | 2/2013 | Braun et al. | |
| 8,432,614 B2 * | 4/2013 | Amitai | G02C 11/10 359/633 |
| 8,538,009 B2 | 9/2013 | Gerhardt et al. | |
| 8,559,621 B2 | 10/2013 | Gerhardt et al. | |
| 8,692,739 B2 * | 4/2014 | Mathieu | G02B 27/01 345/7 |
| 8,825,406 B2 * | 9/2014 | Kumon | G01C 21/365 701/533 |
| 2003/0071766 A1 * | 4/2003 | Hartwell | A42B 3/30 345/8 |
| 2004/0104864 A1 * | 6/2004 | Nakada | G02B 27/017 345/8 |
| 2005/0137755 A1 | 6/2005 | Chase et al. | |
| 2006/0103590 A1 * | 5/2006 | Divon | G02B 27/01 345/7 |
| 2006/0119539 A1 | 6/2006 | Kato et al. | |
| 2007/0076897 A1 | 4/2007 | Philipp | |
| 2007/0106172 A1 | 5/2007 | Abreu | |
| 2007/0121959 A1 | 5/2007 | Philipp | |
| 2007/0281762 A1 | 12/2007 | Barros et al. | |
| 2008/0068559 A1 | 3/2008 | Howell et al. | |
| 2008/0080705 A1 | 4/2008 | Gerhardt et al. | |
| 2008/0140416 A1 * | 6/2008 | Shostak | H04M 1/6041 704/270.1 |
| 2008/0239080 A1 * | 10/2008 | Moscato | A42B 3/0426 348/148 |
| 2009/0055739 A1 | 2/2009 | Murillo et al. | |
| 2009/0234614 A1 * | 9/2009 | Kahn | G02C 5/001 702/141 |
| 2010/0001928 A1 * | 1/2010 | Nutaro | G02B 27/017 345/8 |
| 2010/0066832 A1 | 3/2010 | Nagahara et al. | |
| 2010/0079356 A1 | 4/2010 | Hoellwarth | |
| 2010/0149073 A1 | 6/2010 | Chaum | |
| 2010/0157430 A1 | 6/2010 | Hotta et al. | |
| 2010/0164702 A1 * | 7/2010 | Sasaki | G01B 21/22 340/438 |
| 2010/0245585 A1 * | 9/2010 | Fisher | H04M 1/6066 348/164 |
| 2010/0295769 A1 * | 11/2010 | Lundstrom | G06F 3/011 345/156 |
| 2011/0077056 A1 | 3/2011 | Park et al. | |
| 2011/0080289 A1 * | 4/2011 | Minton | G02B 27/017 340/573.1 |
| 2011/0121976 A1 * | 5/2011 | Johns | A61B 3/113 340/576 |
| 2011/0125756 A1 | 5/2011 | Spence et al. | |
| 2011/0187547 A1 * | 8/2011 | Kweon | B60K 35/00 340/670 |
| 2011/0187844 A1 | 8/2011 | Ogawa et al. | |
| 2011/0231757 A1 * | 9/2011 | Haddick | G02B 27/017 715/702 |
| 2011/0241976 A1 * | 10/2011 | Boger | G02B 27/0172 345/8 |
| 2011/0267321 A1 | 11/2011 | Hayakawa | |
| 2012/0019641 A1 * | 1/2012 | Reeder, III | H04N 7/18 348/61 |
| 2012/0050138 A1 * | 3/2012 | Sato | B60K 35/00 345/4 |
| 2012/0075170 A1 * | 3/2012 | Watson | B64D 10/00 345/8 |
| 2012/0086625 A1 * | 4/2012 | Takeda | G02B 27/0172 345/8 |
| 2012/0206322 A1 * | 8/2012 | Osterhout | G02B 27/0093 345/8 |
| 2012/0235902 A1 * | 9/2012 | Eisenhardt | A42B 3/042 345/156 |
| 2012/0287040 A1 * | 11/2012 | Moore | G02B 27/01 345/157 |
| 2013/0021225 A1 | 1/2013 | Braun et al. | |
| 2013/0044129 A1 * | 2/2013 | Latta | G09G 5/00 345/633 |
| 2013/0063336 A1 * | 3/2013 | Sugimoto | B60K 35/00 345/156 |
| 2013/0093788 A1 * | 4/2013 | Liu | G06F 3/011 345/633 |
| 2013/0095894 A1 | 4/2013 | Gerhardt et al. | |
| 2013/0120449 A1 * | 5/2013 | Ihara | G06F 11/0727 345/633 |

(56) References Cited

U.S. PATENT DOCUMENTS

| | | |
|---|---|---|
| 2013/0154906 A1 | 6/2013 | Braun et al. |
| 2013/0210497 A1 | 8/2013 | Gerhardt et al. |
| 2013/0314303 A1* | 11/2013 | Osterhout ............... G06F 3/005 345/8 |
| 2013/0335301 A1 | 12/2013 | Wong et al. |

FOREIGN PATENT DOCUMENTS

| | | | |
|---|---|---|---|
| JP | 2005-72867 | 3/2005 | |
| WO | WO 0161672 A1 * | 8/2001 | |
| WO | WO-0161672 A1 * | 8/2001 | ............. G06F 3/014 |

OTHER PUBLICATIONS

Pentland et al., "Modeling and Prediction of Human Behavior", Neural Computation (Massachusetts Institute of Technology) vol. 11, pp. 229-242 (Nov. 1999).
Cakmakci, O., et al., "Head-Worn Displays: A Review," Journal of Display Technology, vol. 2, pp. 199-216, 2006.

* cited by examiner

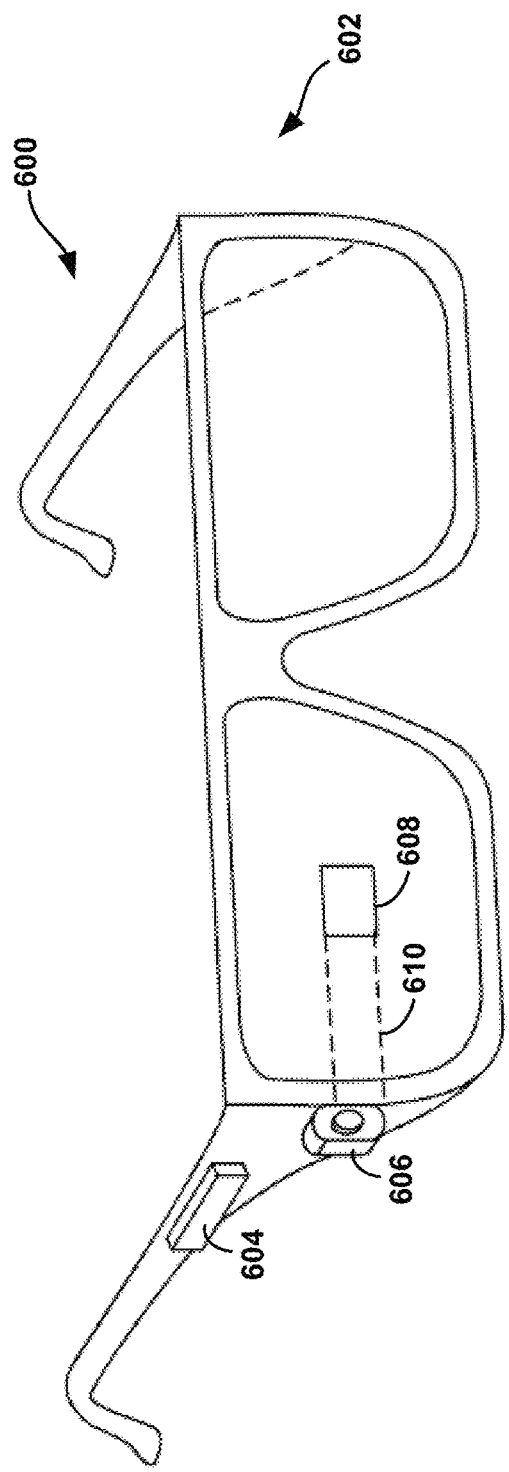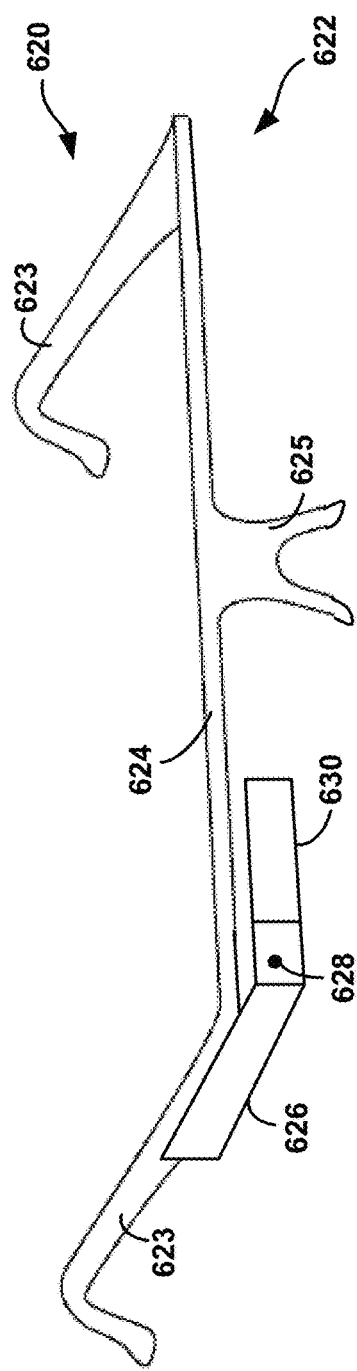
FIG. 6a
FIG. 6b

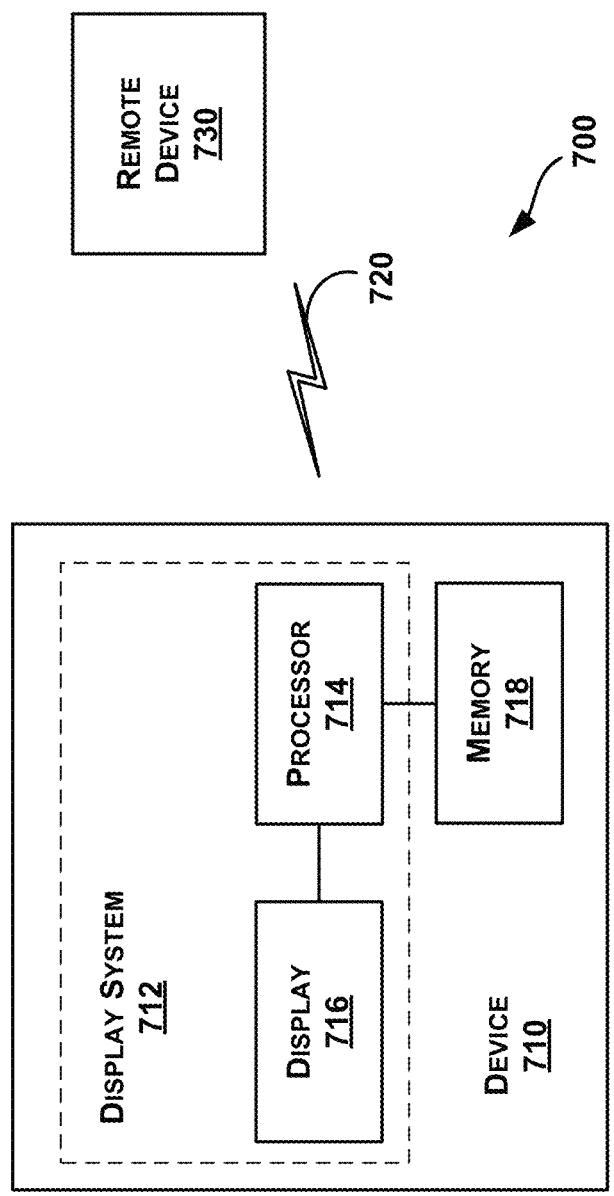

DETERMINING CORRELATED MOVEMENTS ASSOCIATED WITH MOVEMENTS CAUSED BY DRIVING A VEHICLE

CROSS-REFERENCE TO RELATED APPLICATION

This application is a continuation of U.S. patent application Ser. No. 13/604,361, filed Sep. 5, 2012, entitled "Determining Correlated Movements Associated with Movements Caused By Driving a Vehicle," which claims priority to U.S. Patent Application No. 61/583,640, filed on Jan. 6, 2012, the contents of each of which are fully incorporated herein by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

SUMMARY

In one aspect, an example computer-implemented method involves: (a) identifying a threshold number of sets of correlated movements, wherein identifying a set of correlated movements comprises: (i) receiving data associated with a first movement of the wearable computing system; (ii) within a predetermined amount of time, receiving data associated with a second movement of the wearable computing system; (iii) determining that the first movement and the second movement are correlated with one another; and (iv) treating the first movement and the second movement as the set of correlated movements; (b) determining that the threshold number of sets of correlated movements are associated with movements caused by driving a vehicle; and (c) causing the wearable computing system to select a driving user interface for the wearable computing system.

In another aspect, a non-transitory computer readable medium having instructions stored thereon that, in response to execution by a processor, cause the processor to perform operations is disclosed. According to an example embodiment, the instructions include: (a) instructions for identifying a threshold number of sets of correlated movements, wherein the instructions for identifying a set of correlated movements comprise: (i) instructions for receiving data associated with a first movement of the wearable computing system; (ii) instructions for receiving, within a predetermined amount of time, data associated with a second movement of the wearable computing system; (iii) instructions for determining that the first movement and the second movement are correlated with one another; and (iv) instructions for treating the first movement and the second movement as the set of correlated movements; (b) instructions for determining that the threshold number of sets of correlated movements are associated with movements caused by driving a vehicle; and (c) instructions for causing the wearable computing system to select a driving user interface for the wearable computing system.

In yet another aspect, a wearable computing system is disclosed. An example wearable computing system includes a head-mounted display, wherein the head-mounted display is configured to display computer-generated information and allow visual perception of a real-world environment. The example wearable computing system also includes a controller, wherein the controller is configured to: (a) identify a threshold number of sets of correlated movements, wherein identifying a set of correlated movements comprises: (i) receiving data associated with a first movement of the wearable computing system; (ii) within a predetermined amount of time, receiving data associated with a second movement of the wearable computing system; (iii) determining that the first movement and the second movement are correlated with one another; and (iv) treating the first movement and the second movement as the set of correlated movements; (b) determine that the threshold number of sets of correlated movements are associated with movements caused by driving a vehicle; and (c) cause the wearable computing system to select a driving user interface for the wearable computing system.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 6a illustrates an example system for receiving, transmitting, and displaying data.

FIG. 6b illustrates an example system for receiving, transmitting, and displaying data.

FIG. 7 illustrates a schematic drawing of an example computer network infrastructure.

DETAILED DESCRIPTION

Figure 1:
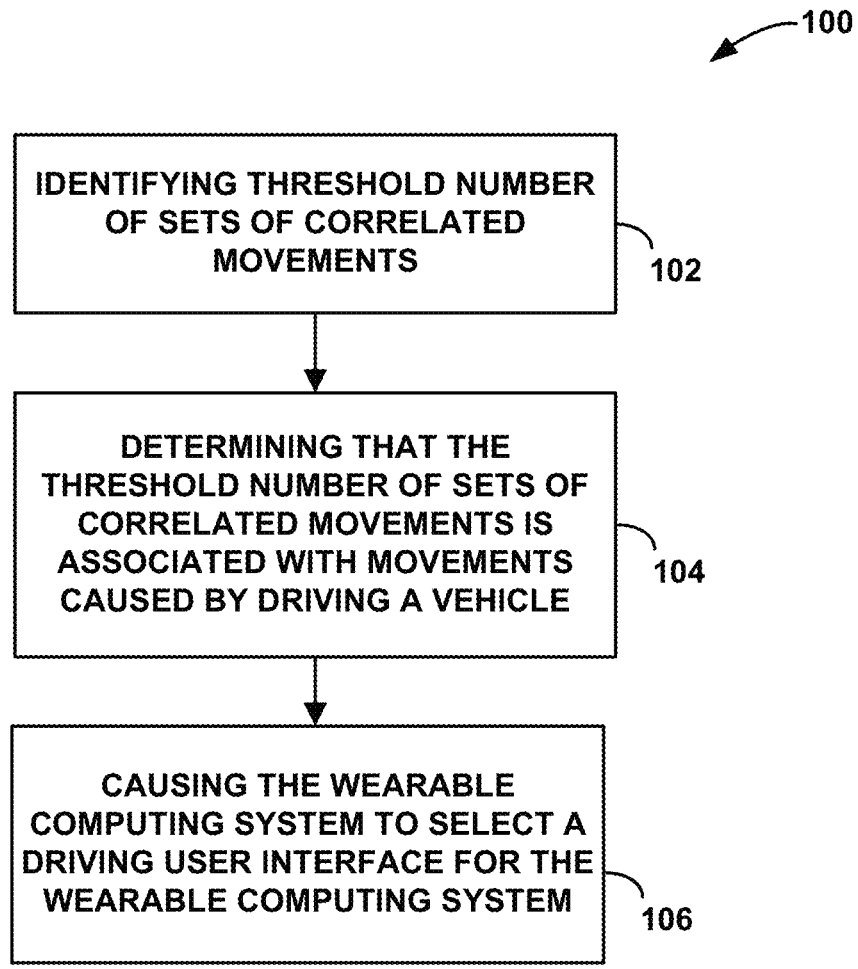
FIG. 1 is a flow chart illustrating a method according to an example embodiment.

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

I. OVERVIEW

A wearable computing device may be configured to display computer-generated information in accordance with a user interface and to allow visual perception of the physical world. Advantageously, the computer-generated information may be integrated with a user's perception of the physical world. For example, the computer-generated information may supplement a user's perception of the physical world with useful computer-generated information related to what the user is perceiving or experiencing at a given moment.

A user may be engaged in a variety of activities while a user is wearing and using a wearable computing device. For instance, the user may be standing, sitting, walking, running, or operating a vehicle. A given user interface provided by the wearable computing device may be more appropriate for one type of user activity than another type of user activity. Thus, it may be beneficial for a wearable computing device to adjust the user interface in accordance with the activity of the user wearing the wearable computing device. For instance, the wearable computing device may be configured to provide different user interfaces when a user is standing, sitting, walking, running, or driving (or otherwise operating) a vehicle.

The methods and systems described herein can facilitate determining that a user of a wearable computing system is driving a vehicle (e.g., a car), and then selecting a driving user interface that is appropriate for driving. In particular, the wearable computing system may determine certain combinations of two or more movements that are correlated with driving. For instance, the wearable computer may consider the combination of movements that corresponds to a user's action that controls a vehicle (e.g., reaching for and turning on a turn signal) followed by the resulting movement of the vehicle (e.g., the vehicle turning) to be indicative of driving. Further, an exemplary wearable computing system may require that a threshold number of such combinations be detected before loading a driving interface, in order to help avoid false positives.

As such, an example method may involve: (i) identifying a threshold number of sets of correlated movements; (ii) determining that the threshold number of sets of correlated movements are associated with movements caused by driving a vehicle; and (iii) causing the wearable computing system to select a driving user interface for the wearable computing system, such that the user interface is appropriate for driving.

In accordance with an example embodiment, identifying a set of correlated movements involves (i) receiving data associated with a first movement of the wearable computing system; (ii) within a predetermined amount of time, receiving data associated with a second movement of the wearable computing system; (iii) determining that the first movement and the second movement are correlated with one another; and (iv) treating the first movement and the second movement as the set of correlated movements.

Also in accordance with an example embodiment, the first movement of the wearable computing system is characteristic of a body movement associated with driving the vehicle, and the second movement of the wearable computing device is characteristic of a movement of the vehicle. The first movement may be of a smaller scale than the second movement. In particular, the first movement may be a small-scale body movement that leads to or results in a large-scale movement of the vehicle.

II. EXEMPLARY METHODS

Exemplary methods may involve a wearable computing system determining that a user of a wearable computing system is driving a vehicle (e.g., a car), and then selecting a driving user interface that is appropriate for driving. FIG. 1 is a flow chart illustrating a method according to an example embodiment. More specifically, example method 100 involves identifying a threshold number of sets of correlated movements, as shown by block 102. The method may then involve determining that the threshold number of sets of correlated movements is associated with movements caused by driving a vehicle, as shown by block 104. Further, the method may involve causing the wearable computing system to select a driving user interface for the wearable computing system, as shown by block 106.

Although the exemplary method 100 is described by way of example as being carried out by a wearable computing system (e.g., such as wearable computing system 600, 800, or 820), it should be understood that an example method may be carried out by a wearable computing device in combination with one or more other entities, such as a remote server in communication with the wearable computing system.

A. Identifying a Threshold Number of Sets of Correlated Movements

As mentioned above, at block 102 the wearable computing system may identify a threshold number of sets of correlated movements. In order to identify the threshold number of correlated-movement sets, the wearable computing system may detect a plurality of sets of movements that are correlated with one another (e.g., a movement (or movement indicative of another movement) that causes a second movement).

Figure 3:
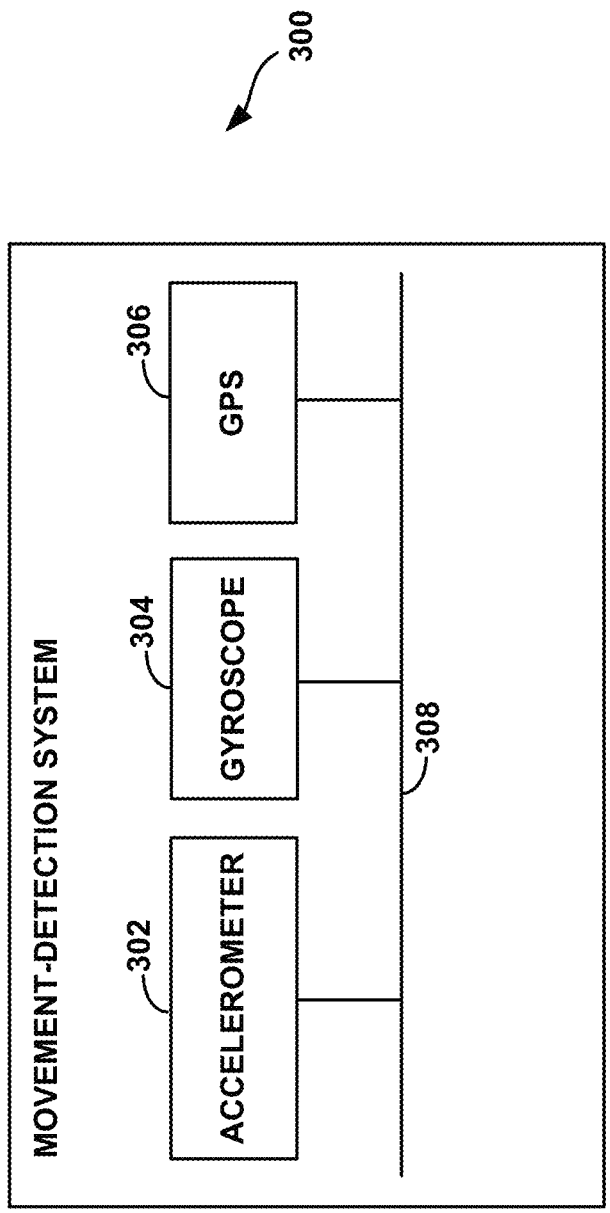
FIG. 3 is a schematic drawing of an example movement-detection system, according to an example embodiment.

In an example, the wearable computing system includes a movement-detection system, which may include one or more movement-detection sensors. An example movement-detection system is illustrated in FIG. 3. In this example of FIG. 3, the movement-detection system 300 includes an accelerometer 302, a gyroscope 304, and a global positioning system (GPS) 306, each connected to one another via a bus 308. The sensors may be configured to detect movement data related to the wearable computing system. More or fewer sensors are possible. For instance, in an example embodiment, the movement-detection system may include only an accelerometer.

Figure 2:
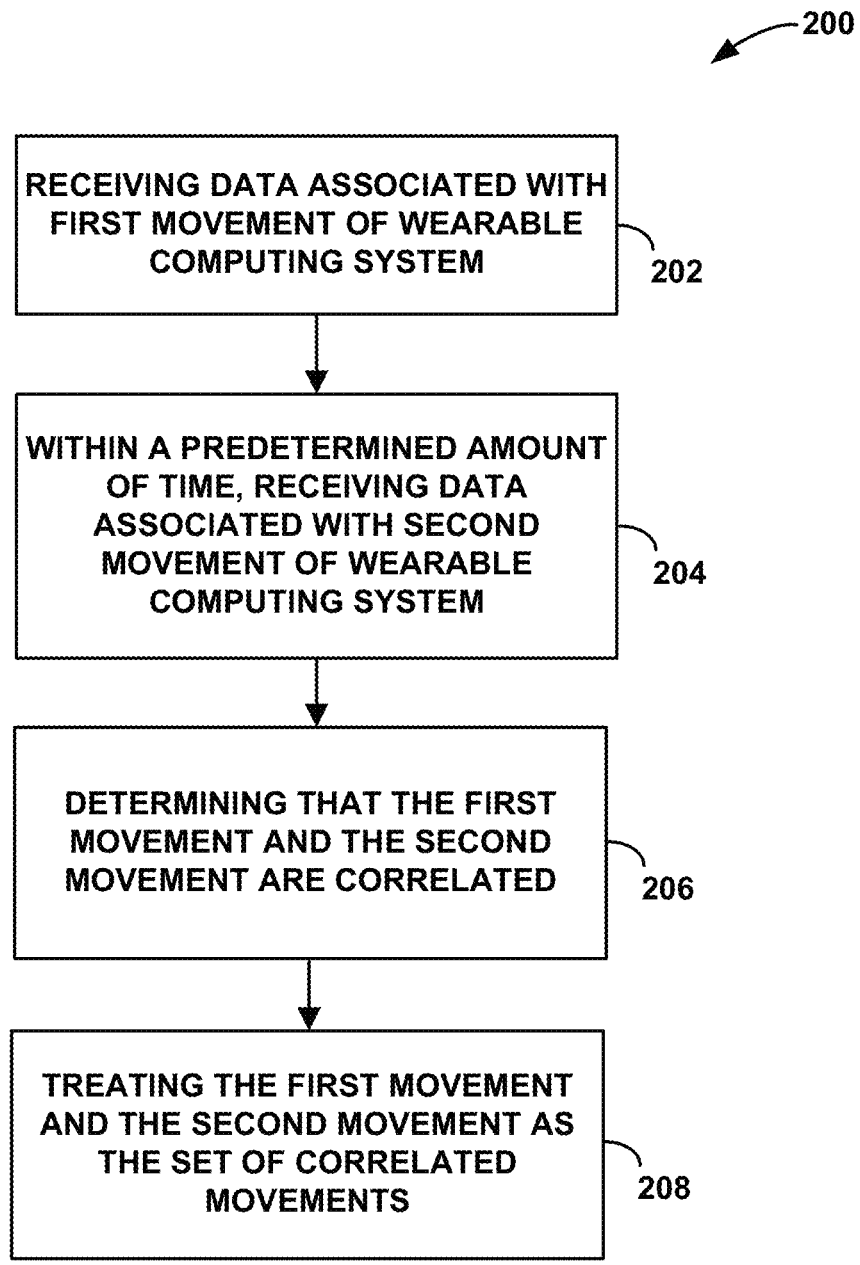
FIG. 2 is a flow chart illustrating a method according to an example embodiment.

The wearable computing system may identify a set of correlated movements in a variety of ways. Generally, a body movement of the driver (e.g., turning the steering wheel) may result in a correlated movement of the vehicle (e.g., turning in the direction in which the driver turned the steering wheel). An example method of identifying a set of correlated movements is depicted in FIG. 2. The wearable computing may, in accordance with method 200, detect movements of the wearable computing system (e.g., movements caused by a body movement and movements caused by vehicle movement) and determine that the movements are correlated. In particular, method 200 includes receiving data associated with a first movement of the wearable computing system, as shown by block 202. Further, method 200 includes, within a predetermined amount of time, receiving data associated with a second movement of the wearable computing system, as shown by block 204. Still further, the method includes determining that the first movement and the second movement are correlated with one another, as shown by block 206. Yet still further, the method includes treating the first movement and the second movement as the set of correlated movements, as shown by block 208.

As mentioned above, at block 202 the movement-detection system 300 may receive data associated with a first movement. This first movement of the wearable computing system may be characteristic of a body movement associated with driving the vehicle. For instance, the first movement may be a) body movement associated with turning on a turn signal, (b) body movement associated with shifting a gear of the vehicle, (c) body movement associated with rotating a steering wheel, and (d) body movement associated with the driver looking over their shoulder. Other example movements characteristic of a body movement associated with driving the vehicle are possible as well.

In an example, the wearable computing system is a head-mounted wearable computing system. A head-mounted system provides a reliable platform for detecting given body movements by measuring a movement of a user's head. In particular, because a head-mounted system may be rigidly mounted to the user, given actions of a user will result in corresponding movements detected by the accelerometer system. For instance, turning a steering wheel may typically result in a movement of a user's head of a given amount (e.g., a movement in the range of 0.5 mm to 2 mm). As another example, shifting a gear shift of a vehicle may typically result in a movement of a user's head of a given amount. As yet another example, a driver looking over their shoulder will also typically result in a movement of one's head a given amount (e.g., a rotation of 60 degrees).

When a user of the wearable computing system is driving a vehicle, these detectable body movements may result in a second movement. Returning to FIG. 2, within a predetermined amount of time of the first movement, the accelerometer system may receive data associated with a second movement of the wearable computing system. This second movement of the wearable computing device may be characteristic of a movement of the vehicle. In particular, these detectable body movements may result in a movement of the vehicle. For instance, the movement of the vehicle may include one or more of the following: (a) movement associated with a lane change, (b) movement associated with acceleration of the vehicle, and (c) movement associated with a turn of the vehicle. Other example vehicle movements are possible as well.

Generally, the corresponding movement of the vehicle will be a movement of a larger scale than the smaller scale of the body movement. As a particular example, a head movement of a small scale (e.g., on the order of millimeters) that indicates the user turned on a turn signal may be associated with a change in lanes, in which the vehicle will move an amount on the order of a few feet.

In addition, the second movement associated with vehicle movement will typically occur within a predetermined amount of time of the first movement (e.g., between 0 and 30 seconds). Based on which body movement the system detects, the predetermined time in which to detect the second vehicle movement may vary. For example, a gear change may result in a movement of the car (e.g., acceleration) within a few seconds. Further, a steering-wheel turn may result in a vehicle movement nearly instantaneously. However, a vehicle movement correlated with turning on a turn signal may not occur until 30 second or more after turning on the turn signal. For instance, the user may take 30 second or longer to switch lanes.

In an example, the wearable computing system may store profile information related to driving-related movements. For instance, the profile information may include information related to given body movements and given vehicle movements, in addition to various predetermined amounts of time associated with given body movements and vehicle movements. Further, the profile information related to driving-related movements may be user-specific.

In accordance with method 100, the wearable computing system may detect a threshold number of sets of correlated movements. In an example, the threshold number is two or greater. The accuracy of the determination that a user of the wearable computing system is driving a vehicle may increase with a higher threshold number. Further, driving-related movements of a user may include preparatory movements for a driving action and the driving action itself. Different driving actions may be associated with different preparatory movements and driving movements. For example, a lane change may include the following detectable sets of correlated movements: (1) the driver making preparatory movements to center the car in the current lane, (2) a driver looking around to make sure the adjacent lane is clear and steering to initiate the lane change, (3) the driver steering to terminate the lane change, and (4) the driver steering to re-center the car in the new lane. Each of these examples may involve detectable movements of both the driver and the vehicle. In an example, the wearable computing system may determine that the user is driving by detecting any of these sets of movements. However, the accuracy of the determination may increase with the wearable computing system detecting more than one of these sets of movements.

In an example, the wearable computing system may begin attempting to identify correlated movements when the system detects that a user of a wearable computing system is traveling over a predetermined speed (e.g., over 15 miles per hour). Traveling over a given speed may serve to indicate that a user is likely traveling in a vehicle.

B. Determining that the Threshold Number of Sets of Correlated Movements are Associated with Movements Caused by Driving a Vehicle As mentioned above, at block 104, the wearable computing system may determine that that the threshold number of sets of correlated movements is associated with movements caused by driving a vehicle. For instance, the wearable computing system may detect ten sets of correlated movements, and each of these sets may be movements correlated with driving.

In an example, the wearable computing system may only treat the first movement and the second movement as a set of correlated movements if the movements are indicative of movements is associated with movements caused by driving a vehicle. In such an example, the step of determining that the threshold number of sets of correlated movements is associated with movements caused by driving a vehicle may occur at the same time as the step of identifying a threshold number of sets of correlated movements. The wearable computing system may determine that the threshold number of sets of correlated movements is associated with movements caused by driving a vehicle simply by the fact that the threshold number of sets of correlated movements exists.

C. Causing the Wearable Computing System to Select a Driving User Interface for the Wearable Computing System After determining that the user of the wearable computing system is driving a vehicle, the wearable computing system may select a driving user interface for the wearable computing system. By selecting a driving user interface, the user interface may be appropriate for driving. In an example, a controller of the wearable computing device may be configured to make this user-interface selection.

Generally, the user interface of a wearable computing system may include how the user perceives the computer-generated information and/or how the user is able to interact with the wearable computing device. A given user interface may be appropriate for a first activity while being less appropriate for a second user activity. For example, the user interface may include visual user-interface settings, and some settings may be appropriate for a given activity but less appropriate for another activity. As another example, the user interface may include audio user-interface settings, and some audio settings may be appropriate for a given activity but less appropriate for another activity.

In an example, a driving user interface may include a user interface that serves to assist the driver with the activity of driving. For instance, the user interface may comprise displaying a map. As another example, a driving user interface includes a user interface that allows the driver to focus on the driving task at hand. As such, the driving user interface may be an interface that minimizes or eliminates distractions to the user. For instance, the user interface may involve turning off the display of the wearable computing system. As another example, a driving user interface may include a user interface that provides auditory cues for information. For example, the driving user interface may provide auditory cues for information that would typically be displayed in the wearable-computing-system display. As a particular example, in the case of an incoming call, the user interface may provide an auditory cue that alerts the driver of the incoming call. The user interface may also allow the user to input a voice command to instruct the wearable computing system with respect to the incoming call (e.g., "Answer" or "Send to voicemail").

As yet another example, a driving user interface may include a user interface that displays vehicle information. For instance, if the wearer of the wearable computing system is determined to be the driver, the wearable computing system may hook into the car telemetry (e.g., via wireless technology such as Bluetooth® technology) in order to access vehicle information. Such vehicle information may include, for example, speedometer information, tachometer information, and vehicle-lights information. Other vehicle information may be obtained as well. In such an example, the user interface may comprise displaying this vehicle information.

As still yet another example, the driving user interface may include communication settings and/or internet settings that are useful and/or appropriate for a driver. As an example, driving communication settings may include settings that disable text messaging, send incoming phone calls directly to voicemail, and prevent at least some outgoing and incoming phone calls (e.g., calls aside from emergency phone calls). Driving internet settings may include disabling internet applications that would require active input from the driver. Other driving communication settings and driving internet settings appropriate for driving are possible as well.

Figure 8A:
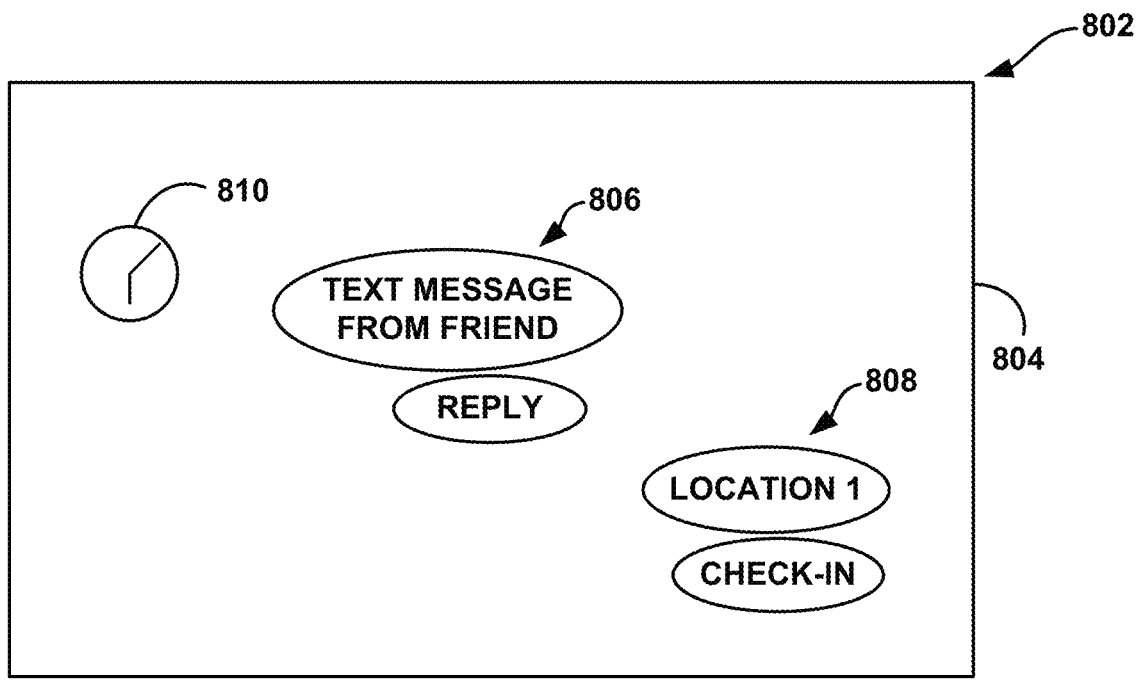
FIG. 8a is an illustration of a user interface according to an example embodiment.
Figure 8B:
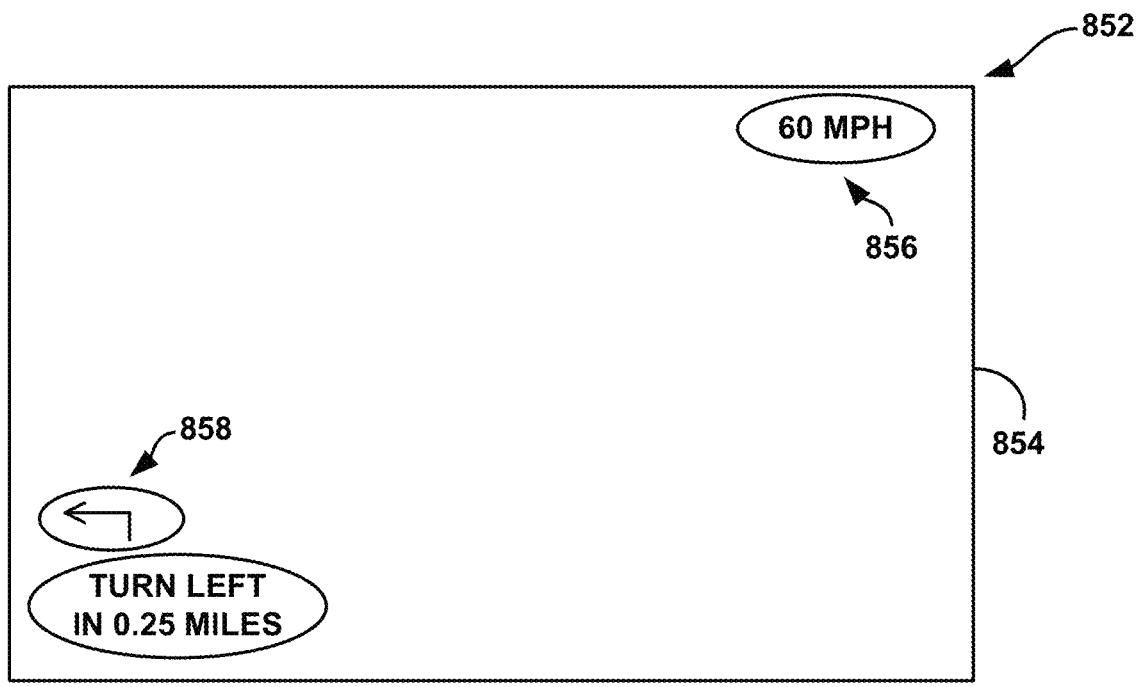
FIG. 8b is an illustration of a user interface according to another example embodiment.

FIGS. 8a and 8b are illustrations of user interfaces according to example embodiments. In particular, FIG. 8a is an example user interface that may be appropriate while a user is not driving, and FIG. 8b is an example driving user interface.

With reference to FIG. 8a, an example user interface 802 is described. User interface 802 may, for example, be a user interface for a wearable computing system before the wearable computing system detects that the user is driving. User interface 802 comprises a display 804 that includes various display items, such as display items 806, 808, and 810. Display item 806 is a display of an incoming text message, and this display item is located in the center of the display. Further, display item 808 is a display of a check-in location. Further, display item 810 is a display of the current time.

Other example user interfaces for before the wearable computing system detects that the user is driving are possible as well. If the wearable computing system detects that the user is driving, the wearable computing system may select a different user interface, such as a driving user interface.

With reference to FIG. 8b, an example driving user interface 852 is described. Driving user interface 852 may be a user interface selected by the wearable computing system responsive to determining that the threshold number of sets of correlated movements are associated with movements caused by driving a vehicle. User interface 852 comprises a display 854 that includes driving-related information for the driver. Display items 856 and 858 are example driving-related information items that could be displayed in user interface 852. In particular, display item 856 shows the miles per hour (MPH) at which the vehicle is traveling. Further, display item 858 shows a direction indication to the driver, which may serve to alert the user of directions to the user's desired destination. Other example driving user interfaces are possible as well.

D. Additional Sensors

As mentioned above, the wearable computing system may include one or more sensors, such as accelerometer 302, gyroscope 304, and global positioning system (GPS) 306. As described above, these sensors may be disposed on a head-mounted wearable computing system. A head-mounted system provides a reliable platform for detecting both body-related movements and vehicle-related movements. In addition to an accelerometer, a gyroscope, and a GPS, other sensors are possible as well. For example, the wearable computing system may include a magnetometer. A magnetometer may, for instance, be useful in determining that a user is steering a vehicle. As a user steers the vehicle (e.g., turns the steering wheel), a magnetometer may detect a change in the direction of the vehicle. In an example, since a driver on average faces forward while driving, the average direction of the driver's head would change with respect to the Earth's magnetic field after a turn. In an example, an accelerometer may detect a motion that corresponds to steering, and the magnetometer may then detect a change in the average magnetometer direction that corresponds to the vehicle turning as a result of the steering motion.

Further, the sensors may also be located in other positions. For example, the wearable computing system may include a sensor disposed on another portion of a user's body, such as on a user's wrist. By having a sensor disposed on a user's wrist, the wearable computing system could detect precise movements of a user's hand.

In another example, the wearable computing system may be configured to link up with the controller-area network (CAN) bus of a vehicle. In such a case, the wearable computing system may determine that the user is in a vehicle, and thus the wearable computing system may then undergo an analysis to determine whether the user is the driver.

E. Example Benefits of Disclosed Method and System

Beneficially, by determining whether a user of a wearable computing system is driving a vehicle, the wearable computing system may select a driving user-interface. Further, the disclosed systems and method provide a reliable system and method for determining whether a user of a wearable computing system is driving. A head-mounted movement-detection system may be more reliable than other movement-detection systems, such as movement-detection systems disposed on a cell phone held in a user's pocket.

Further, determining whether a user of a wearable computing system is driving and responsively selecting a driving user interface may beneficially improve vehicle safety. For instance, as the wearable-computing-system display may be focused at infinity, this allows the user to glance at the vehicle telemetry without changing the focus of the user's eyes. This is in contrast to a user glancing at vehicle information by glancing at a standard vehicle dashboard. A glance at a standard dashboard may typically result in the eyes not focusing on the traffic in front of the user for approximately 1.5 seconds (as the driver's eyes are changing the physical shape of the eye's lens when focusing from far to near to far). However, with the user interface displaying the vehicle telemetry, the user can change his attention from the telemetry display to the traffic without a delay.

Still further, by identifying correlated movements in accordance with embodiments of the disclosed system and method, the wearable computing system can reliably distinguish between users who are driving a vehicle and users that are a passenger of a vehicle. Thus, the wearable computing system may also be capable of providing a passenger user interface that is appropriate for passengers. As an example, a wearable computing system may be configured to automatically display vehicle information if the user is the driver, but not automatically display vehicle information if the user is a passenger.

III. EXAMPLE SYSTEMS AND DEVICES

Figure 4:
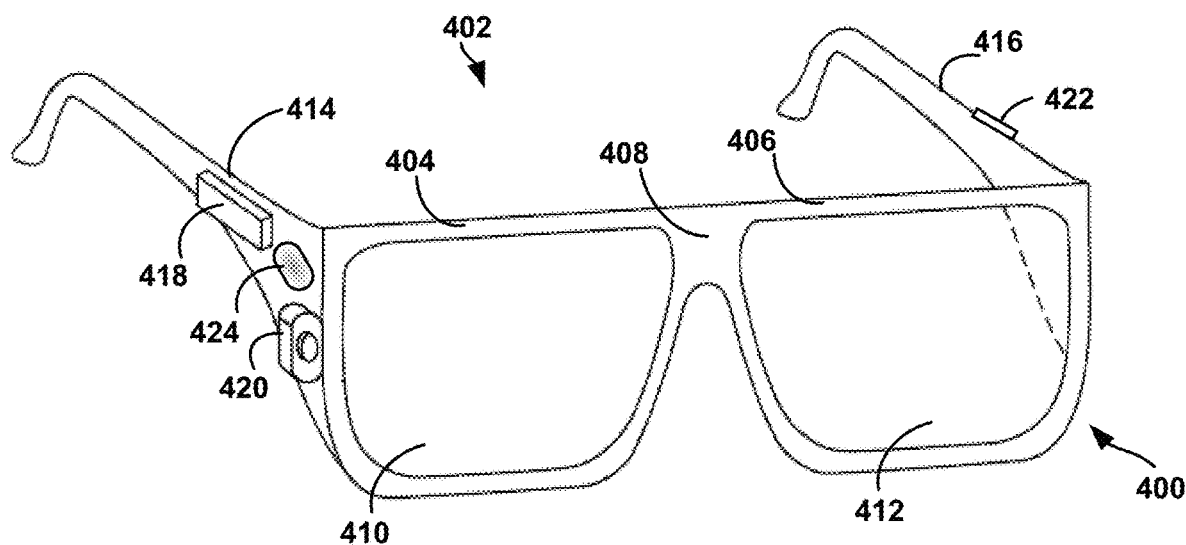
FIG. 4 illustrates an example system for receiving, transmitting, and displaying data.

FIG. 4 illustrates an example system 400 for receiving, transmitting, and displaying data. The system 400 is shown in the form of a wearable computing device. System 400 may be configured to carry out methods 100 and 200. While FIG. 4 illustrates a head-mounted device 402 as an example of a wearable computing device, other types of wearable computing devices could additionally or alternatively be used. As illustrated in FIG. 4, the head-mounted device 402 comprises frame elements including lens-frames 404, 406 and a center frame support 408, lens elements 410, 412, and extending side-arms 414, 416. The center frame support 408 and the extending side-arms 414, 416 are configured to secure the head-mounted device 402 to a user's face via a user's nose and ears, respectively.

Each of the frame elements 404, 406, and 408 and the extending side-arms 414, 416 may be formed of a solid structure of plastic and/or metal, or may be formed of a hollow structure of similar material so as to allow wiring and component interconnects to be internally routed through the head-mounted device 402. Other materials may be possible as well.

One or more of each of the lens elements 410, 412 may be formed of any material that can suitably display a projected image or graphic. Each of the lens elements 410, 412 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 414, 416 may each be projections that extend away from the lens-frames 404, 406, respectively, and may be positioned behind a user's ears to secure the head-mounted device 402 to the user. The extending side-arms 414, 416 may further secure the head-mounted device 402 to the user by extending around a rear portion of the user's head. Additionally or alternatively, for example, the system 400 may connect to or be affixed within a head-mounted helmet structure. Other possibilities exist as well.

The system 400 may also include an on-board computing system 418, a video camera 420, a sensor 422, and a finger-operable touch pad 424. The on-board computing system 418 is shown to be positioned on the extending side-arm 414 of the head-mounted device 402; however, the on-board computing system 418 may be provided on other parts of the head-mounted device 402 or may be positioned remote from the head-mounted device 402 (e.g., the on-board computing system 418 could be wire- or wirelessly-connected to the head-mounted device 402). The on-board computing system 418 may include a processor and memory, for example. The on-board computing system 418 may be configured to receive and analyze data from the video camera 420 and the finger-operable touch pad 424 (and possibly from other sensory devices, user interfaces, or both) and generate images for output by the lens elements 410 and 412.

The video camera 420 is shown positioned on the extending side-arm 414 of the head-mounted device 402; however, the video camera 420 may be provided on other parts of the head-mounted device 402. The video camera 420 may be configured to capture images at various resolutions or at different frame rates. Many video cameras with a small form-factor, such as those used in cell phones or webcams, for example, may be incorporated into an example of the system 400.

Further, although FIG. 4 illustrates one video camera 420, more video cameras may be used, and each may be configured to capture the same view, or to capture different views. For example, the video camera 420 may be forward facing to capture at least a portion of the real-world view perceived by the user. This forward facing image captured by the video camera 420 may then be used to generate an augmented reality where computer generated images appear to interact with the real-world view perceived by the user.

The sensor 422 is shown on the extending side-arm 416 of the head-mounted device 402; however, the sensor 422 may be positioned on other parts of the head-mounted device 402. The sensor 422 may include one or more of a gyroscope or an accelerometer, for example. Other sensing devices may be included within, or in addition to, the sensor 422 or other sensing functions may be performed by the sensor 422.

The finger-operable touch pad 424 is shown on the extending side-arm 414 of the head-mounted device 402. However, the finger-operable touch pad 424 may be positioned on other parts of the head-mounted device 402. Also, more than one finger-operable touch pad may be present on the head-mounted device 402. The finger-operable touch pad 424 may be used by a user to input commands. The finger-operable touch pad 424 may sense at least one of a position and a movement of a finger via capacitive sensing, resistance sensing, or a surface acoustic wave process, among other possibilities. The finger-operable touch pad 424 may be capable of sensing finger movement in a direction parallel or planar to the pad surface, in a direction normal to the pad surface, or both, and may also be capable of sensing a level of pressure applied to the pad surface. The finger-operable touch pad 424 may be formed of one or more translucent or transparent insulating layers and one or more translucent or transparent conducting layers. Edges of the finger-operable touch pad 424 may be formed to have a raised, indented, or roughened surface, so as to provide tactile feedback to a user when the user's finger reaches the edge, or other area, of the finger-operable touch pad 424. If more than one finger-operable touch pad is present, each finger-operable touch pad may be operated independently, and may provide a different function.

Figure 5:
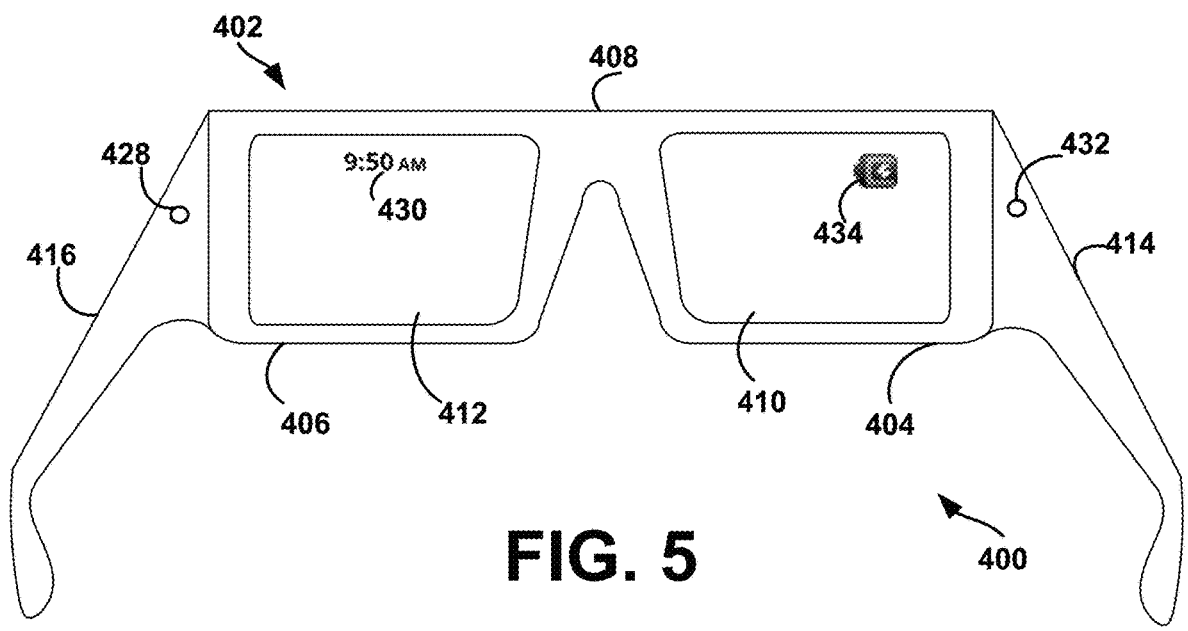
FIG. 5 illustrates an alternate view of the system illustrated in FIG. 4.

FIG. 5 illustrates an alternate view of the system 400 illustrated in FIG. 4. As shown in FIG. 5, the lens elements 410, 412 may act as display elements. The head-mounted device 402 may include a first projector 428 coupled to an inside surface of the extending side-arm 416 and configured to project a display 430 onto an inside surface of the lens element 412. Additionally or alternatively, a second projector 432 may be coupled to an inside surface of the extending side-arm 414 and configured to project a display 434 onto an inside surface of the lens element 410.

The lens elements 410, 412 may act as a combiner in a light projection system and may include a coating that reflects the light projected onto them from the projectors 428, 432. In some embodiments, a reflective coating may not be used (e.g., when the projectors 428, 432 are scanning laser devices).

In alternative embodiments, other types of display elements may also be used. For example, the lens elements 410, 412 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 404, 406 for driving such a matrix display. Alternatively or additionally, a laser or LED source and scanning system could be used to draw a raster display directly onto the retina of one or more of the user's eyes. Other possibilities exist as well.

FIG. 6a illustrates an example system 600 for receiving, transmitting, and displaying data. System 600 may be configured to carry out method 100 and method 200. The system 600 is shown in the form of a wearable computing device 602. The wearable computing device 602 may include frame elements and side-arms such as those described with respect to FIGS. 4 and 5. The wearable computing device 602 may additionally include an on-board computing system 604 and a video camera 606, such as those described with respect to FIGS. 4 and 5. The video camera 606 is shown mounted on a frame of the wearable computing device 602; however, the video camera 606 may be mounted at other positions as well.

As shown in FIG. 6a, the wearable computing device 602 may include a single display 608 which may be coupled to the device. The display 608 may be formed on one of the lens elements of the wearable computing device 602, such as a lens element described with respect to FIGS. 4 and 5, and may be configured to overlay computer-generated graphics in the user's view of the physical world. The display 608 is shown to be provided in a center of a lens of the wearable computing device 602, however, the display 608 may be provided in other positions. The display 608 is controllable via the computing system 604 that is coupled to the display 608 via an optical waveguide 610.

FIG. 6b illustrates an example system 620 for receiving, transmitting, and displaying data. System 620 may be configured to carry out method 100 and method 200. The system 620 is shown in the form of a wearable computing device 622. The wearable computing device 622 may include side-arms 623, a center frame support 624, and a bridge portion with nosepiece 625. In the example shown in FIG. 6b, the center frame support 624 connects the side-arms 623. The wearable computing device 622 does not include lens-frames containing lens elements. The wearable computing device 622 may additionally include an on-board computing system 626 and a video camera 628, such as those described with respect to FIGS. 4 and 5.

The wearable computing device 622 may include a single lens element 630 that may be coupled to one of the side-arms 623 or the center frame support 624. The lens element 630 may include a display such as the display described with reference to FIGS. 4 and 5, and may be configured to overlay computer-generated graphics upon the user's view of the physical world. In one example, the single lens element 630 may be coupled to the inner side (i.e., the side exposed to a portion of a user's head when worn by the user) of the extending side-arm 623. The single lens element 630 may be positioned in front of or proximate to a user's eye when the wearable computing device 622 is worn by a user. For example, the single lens element 630 may be positioned below the center frame support 624, as shown in FIG. 6b.

FIG. 7 illustrates a schematic drawing of an example computer network infrastructure. In system 700, a device 710 communicates using a communication link 720 (e.g., a wired or wireless connection) to a remote device 730. The device 710 may be any type of device that can receive data and display information corresponding to or associated with the data. For example, the device 710 may be a heads-up display system, such as the head-mounted device 402, 600, or 620 described with reference to FIGS. 4-6b.

Thus, the device 710 may include a display system 712 comprising a processor 714 and a display 716. The display 710 may be, for example, an optical see-through display, an optical see-around display, or a video see-through display. The processor 714 may receive data from the remote device 730, and configure the data for display on the display 716. The processor 714 may be any type of processor, such as a micro-processor or a digital signal processor, for example.

The device 710 may further include on-board data storage, such as memory 718 coupled to the processor 714. The memory 718 may store software that can be accessed and executed by the processor 714, for example.

The remote device 730 may be any type of computing device or transmitter including a laptop computer, a mobile telephone, or tablet computing device, etc., that is configured to transmit data to the device 710. The remote device 730 and the device 710 may contain hardware to enable the communication link 720, such as processors, transmitters, receivers, antennas, etc.

In FIG. 7, the communication link 720 is illustrated as a wireless connection; however, wired connections may also be used. For example, the communication link 720 may be a wired serial bus such as a universal serial bus or a parallel bus. A wired connection may be a proprietary connection as well. The communication link 720 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 730 may be accessible via the Internet and may include a computing cluster associated with a particular web service (e.g., social-networking, photo sharing, address book, etc.).

With reference to FIG. 7, device 710 may perform the steps of methods 100 and 200. In particular, methods 100 and 200 may correspond to operations performed by processor 714 when executing instructions stored in a non-transitory computer readable medium. In an example, the non-transitory computer readable medium could be part of memory 718. The non-transitory computer readable medium may have instructions stored thereon that, in response to execution by processor 714, cause the processor 714 to perform various operations in accordance with embodiments of the disclosed methods.

IV. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It should be understood that for situations in which the systems and methods discussed herein collect and/or use any personal information about users or information that might relate to personal information of users, the users may be provided with an opportunity to opt in/out of programs or features that involve such personal information (e.g., information about a user's preferences). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
    at least one sensor integral to a wearable computing system detecting a plurality of movements;
    identifying, from the detected plurality of movements, a threshold number of sets of correlated movements associated with movements caused by driving a vehicle, wherein the threshold number is two or greater, wherein each set of correlated movements comprises (i) a first movement of the wearable computing system characteristic of a body movement associated with driving the vehicle and (ii) a second movement of the wearable computing system characteristic of a movement of the vehicle, wherein the body movement causes the movement of the vehicle; and
    in response to identifying the threshold number of sets of correlated movements associated with movements caused by driving the vehicle, causing the wearable computing system to select a driving user interface for the wearable computing system.

2. The method of claim 1, wherein causing the wearable computing system to select a driving user interface for the wearable computing system comprises:
    hooking into a vehicle telemetry of the vehicle in order to access vehicle information selected from the group consisting of speedometer information, tachometer information, and vehicle-lights information; and
    displaying the accessed vehicle information in a display of the wearable computing system.

3. The method of claim 1, wherein the driving user interface for the wearable computing system is an interface that assists a driver with driving the vehicle.

4. The method of claim 3, wherein the driving user interface comprises a map displayed in a display of the wearable computing system.

5. The method of claim 1, wherein the driving user interface is an interface that minimizes or eliminates distractions to a driver.

6. The method of claim 5, wherein the driving user interface comprises a turned-off display of the wearable computing system.

7. The method of claim 1, wherein causing the wearable computing system to select a driving user interface for the wearable computing system comprises providing auditory cues for information that would typically be displayed in the wearable-computing-system display.

8. The method of claim 1, wherein causing the wearable computing system to select a driving user interface for the wearable computing system comprises:
    selecting at least one communication setting appropriate for a driver, wherein the at least one communication setting is selected from the group consisting of a setting that disables text messaging, a setting that sends incoming phone calls directly to voicemail, and a setting that prevents at least some outgoing and incoming phone calls.

9. The method of claim 8, wherein the at least some outgoing and incoming phone calls comprise phone calls aside from emergency phone calls.

10. The method of claim 1, wherein causing the wearable computing system to select a driving user interface for the wearable computing system comprises:
    disabling internet applications that would require active input from a driver.

11. The method of claim 1, wherein the threshold number is two or greater, and wherein the method further comprises:
    in response to identifying the threshold number of sets of correlated movements associated with movements caused by driving the vehicle, causing the wearable computing system to switch from a non-driving user interface for the wearable computing system to the driving user interface for the wearable computing system.

12. A non-transitory computer readable medium having instructions stored thereon that, in response to execution by a processor, cause the processor to perform operations, the instructions comprising:
    instructions for identifying, from a detected plurality of movements, a threshold number of sets of correlated movements associated with movements caused by driving a vehicle, wherein the threshold number is two or greater, wherein each set of correlated movements comprises (i) a first movement of a wearable computing system characteristic of a body movement associated with driving the vehicle and (ii) a second movement of the wearable computing system characteristic of a movement of the vehicle, wherein the body movement causes the movement of the vehicle; and
    instructions for, in response to identifying the threshold number of sets of correlated movements associated with movements caused by driving the vehicle, causing the wearable computing system to select a driving user interface for the wearable computing system.

13. The non-transitory computer readable medium of claim 12, wherein causing the wearable computing system to select a driving user interface for the wearable computing system comprises:
hooking into a vehicle telemetry of the vehicle in order to access vehicle information selected from the group consisting of speedometer information, tachometer information, and vehicle-lights information; and
displaying the accessed vehicle information in a display of the wearable computing system.

14. The non-transitory computer readable medium of claim 12, wherein causing the wearable computing system to select a driving user interface for the wearable computing system comprises:
selecting at least one communication setting appropriate for a driver, wherein the at least one communication setting is selected from the group consisting of a setting that disables text messaging, a setting that sends incoming phone calls directly to voicemail, and a setting that prevents at least some outgoing and incoming phone calls.

15. The non-transitory computer readable medium of claim 14, wherein the at least some outgoing and incoming phone calls comprise phone calls aside from emergency phone calls.

16. The non-transitory computer readable medium of claim 12, wherein the threshold number is two or greater, and wherein the instructions further comprise:
instructions for, in response to identifying the threshold number of sets of correlated movements associated with movements caused by driving the vehicle, causing the wearable computing system to switch from a non-driving user interface for the wearable computing system to the driving user interface for the wearable computing system.

17. A wearable computing system comprising:
a head-mounted display, wherein the head-mounted display is configured to display computer-generated information and allow visual perception of a real-world environment;
a movement-detection system comprising at least one sensor integral to the wearable computing system configured to detect a plurality of movements;
a controller, wherein the controller is configured to:
(a) identify, from the plurality of movements detected by the at least one sensor, a threshold number of sets of correlated movements associated with movements caused by driving a vehicle, wherein the threshold number is two or greater, wherein each set of correlated movements comprises (i) a first movement of the wearable computing system characteristic of a body movement associated with driving the vehicle and (ii) a second movement of the wearable computing system characteristic of a movement of the vehicle, wherein the body movement causes the movement of the vehicle; and
(b) in response to identifying the threshold number of sets of correlated movements associated with movements caused by driving the vehicle, cause the wearable computing system to switch from a non-driving user interface for the wearable computing system to a driving user interface for the wearable computing system.

18. The wearable computing system of claim 17, wherein causing the wearable computing system to switch from a non-driving user interface for the wearable computing system to a driving user interface for the wearable computing system comprises:
selecting at least one communication setting appropriate for a driver, wherein the at least one communication setting is selected from the group consisting of a setting that disables text messaging, a setting that sends incoming phone calls directly to voicemail, and a setting that prevents at least some outgoing and incoming phone calls.

19. The wearable computing system of claim 17, wherein the controller comprises the movement-detection system.

20. The wearable computing system of claim 19, wherein the at least one sensor comprises a sensor configured to be disposed on a wrist of a driver of the vehicle.

21. The wearable computing system of claim 17, wherein wearable computing system of claim is configured to link up with a controller-area network (CAN) bus of the vehicle.

22. The non-transitory computer readable medium of claim 12, wherein causing the wearable computing system to select a driving user interface for the wearable computing system comprises:
disabling internet applications that would require active input from a driver.

* * * * *